US012569977B1

(12) United States Patent

Gonzalez

(10) Patent No.: US 12,569,977 B1

(45) Date of Patent: Mar. 10, 2026

(54) ADJUSTABLE ANGLE MARKER SYSTEM FOR PIPE ELBOW JOINTS AND METHOD OF USE

(71) Applicant: Leonel Gonzalez, Zapata, TX (US)

(72) Inventor: Leonel Gonzalez, Zapata, TX (US)

( * ) Notice: Subject to any disclaimer, the term of this patent is extended or adjusted under 35 U.S.C. 154(b) by 352 days.

(21) Appl. No.: 18/232,235

(22) Filed: Aug. 9, 2023

(51) Int. Cl.
*G01B 3/56* (2006.01)
*B25H 7/00* (2006.01)

(52) U.S. Cl.
CPC ............... *B25H 7/005* (2013.01); *G01B 3/56* (2013.01)

(58) Field of Classification Search
CPC .................................. B25H 7/005; G01B 3/56
See application file for complete search history.

(56) References Cited

U.S. PATENT DOCUMENTS

| | | | | |
|---|---|---|---|---|
| 2,464,444 A * | 3/1949 | Gantz | .................... | B25H 7/005 |
| | | | | 33/678 |
| 3,673,689 A * | 7/1972 | Magnotto | .............. | B25H 7/005 |
| | | | | 33/471 |
| 4,497,119 A * | 2/1985 | Dearman | ........... | B23K 37/0536 |
| | | | | 33/534 |
| 6,105,268 A * | 8/2000 | Vaughn | .................. | G01B 3/563 |
| | | | | 33/534 |

| | | | | |
|---|---|---|---|---|
| 6,560,887 B2 * | 5/2003 | Byrnes | .................... | G01B 3/563 |
| | | | | 33/534 |
| 6,978,550 B2 * | 12/2005 | Xieh | ......................... | G01B 3/04 |
| | | | | 33/465 |
| 7,188,427 B2 * | 3/2007 | Johnson | .................... | B43L 7/02 |
| | | | | 33/465 |
| 7,373,727 B2 * | 5/2008 | Bruce | ...................... | G01B 3/56 |
| | | | | 33/461 |
| 9,021,713 B1 * | 5/2015 | Pierson | .................... | B43L 7/10 |
| | | | | 33/529 |
| 2002/0088132 A1 * | 7/2002 | Byrnes | .................. | G01B 3/563 |
| | | | | 33/529 |
| 2018/0283581 A1 * | 10/2018 | Ramirez | .................. | F16L 1/06 |
| 2022/0099425 A1 * | 3/2022 | Mieir | ....................... | G01C 9/34 |

* cited by examiner

*Primary Examiner* — Yaritza Guadalupe-McCall

(74) *Attorney, Agent, or Firm* — Richard Eldredge; Leavitt Eldredge Law Firm

(57) ABSTRACT

An adjustable angle marker system for pipe elbow joints is disclosed, providing an efficient and precise means of determining and marking angles for cutting 90-degree elbow joints, particularly at non-standard angles, eliminating the need for reference tables and angle calculations. An adjustable angle gauge is used to measure a desired angle at which to cut an elbow joint to properly join two pipe sections. The desired angle is transferred to a marking platform using the adjustable angle gauge set at the measured angle. The elbow joint is placed on the marking platform so that the angle marked on the marking platform properly aligns with a corresponding cut location on the elbow joint, which is marked on the elbow joint using a pipe marking device aligning the marked angle and the cut location.

5 Claims, 6 Drawing Sheets

103

107

105

133

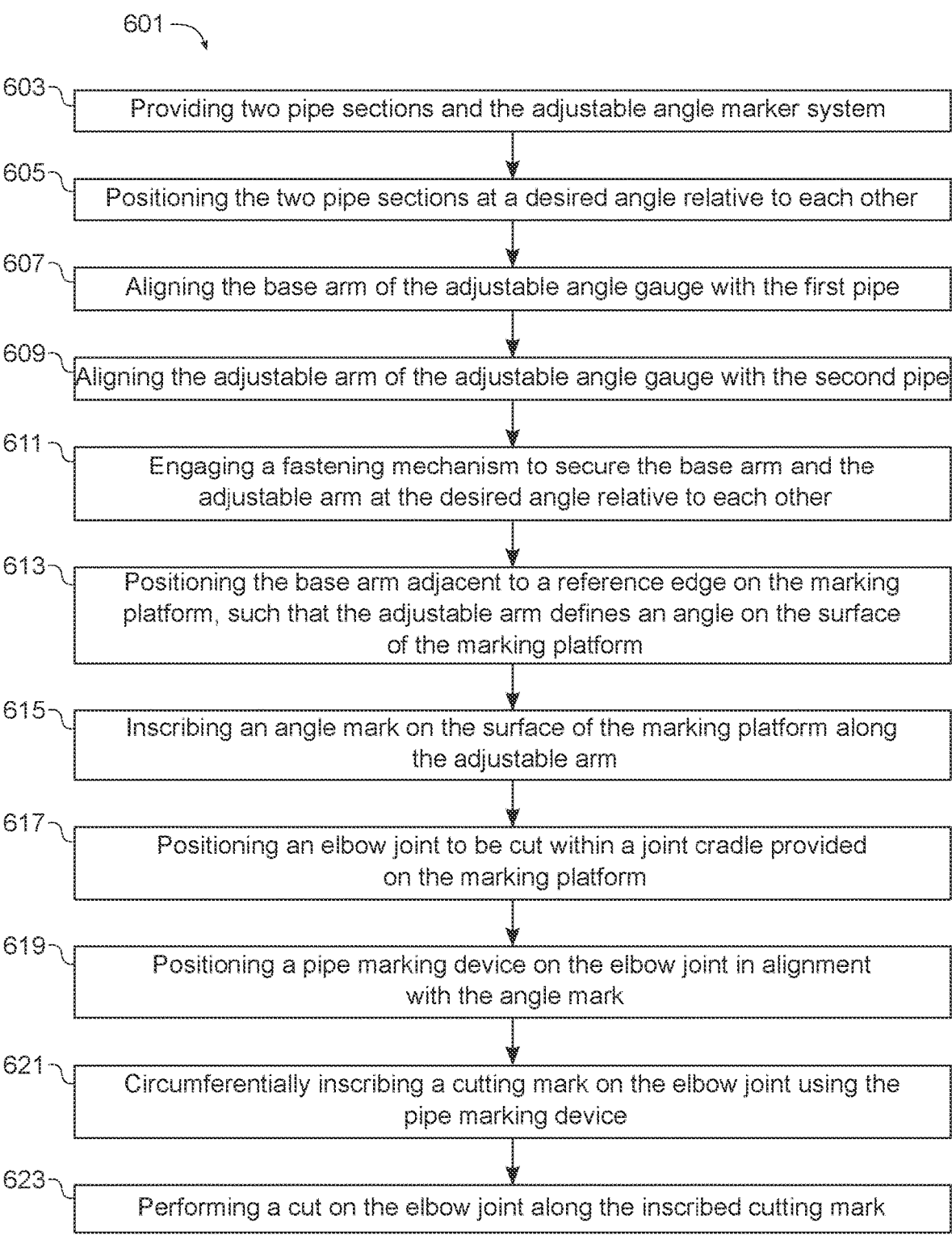

601

603 — Providing two pipe sections and the adjustable angle marker system

605 — Positioning the two pipe sections at a desired angle relative to each other 607 — Aligning the base arm of the adjustable angle gauge with the first pipe 609 — Aligning the adjustable arm of the adjustable angle gauge with the second pipe 611 — Engaging a fastening mechanism to secure the base arm and the adjustable arm at the desired angle relative to each other 613 — Positioning the base arm adjacent to a reference edge on the marking platform, such that the adjustable arm defines an angle on the surface of the marking platform 615 — Inscribing an angle mark on the surface of the marking platform along the adjustable arm 617 — Positioning an elbow joint to be cut within a joint cradle provided on the marking platform 619 — Positioning a pipe marking device on the elbow joint in alignment with the angle mark 621 — Circumferentially inscribing a cutting mark on the elbow joint using the pipe marking device 623 — Performing a cut on the elbow joint along the inscribed cutting mark

FIG. 6

ADJUSTABLE ANGLE MARKER SYSTEM FOR PIPE ELBOW JOINTS AND METHOD OF USE

BACKGROUND

1. Field of the Invention

The present invention relates generally to pipe fitting, and more specifically to an adjustable angle measuring blade kit for precisely marking and cutting 90-degree elbow joints regardless of the desired angle of cut.

2. Description of Related Art

Pipe fitting and welding systems are well known in the art and are effective means to connect and assemble piping networks. For example, conventional pipe fitting blue books provide guidance and formulas for cutting different degrees on various sizes of 90-degree elbow joints, also known as ells or weld ells, such as 2-inch, 3-inch, 4-inch, and so on. One of the problems commonly associated with these conventional systems is the complexity and diversity of the formulas needed for different degrees and sizes, which makes the cutting process tedious, especially when the cutting angle is not specifically known.

Additionally, conventional systems often require the use of degree calculators to determine the correct angle for pipe tie-ins, which can be a significant hurdle for both new and experienced welders. Moreover, these systems fall short in addressing how to effectively and accurately perform miter cuts on 90-degree weld ells that are not an even divisor of 180 degrees, such as 90, 45, or 22.5 degrees.

Accordingly, although great strides have been made in the area of pipe fitting and welding systems, many shortcomings remain. It is therefore an objective of the present invention to provide an adjustable angle marker system that simplifies the process of determining and marking the correct angle for cutting pipe elbow joints, facilitates accurate miter cuts on irregular degree 90 elbow joints, and eliminates the need for complex formulas, angle calculators, or angle reference tables. The invention further includes a marking platform for marking the desired angle and a horse shoe-like bracket for marking to aid in the precise marking and cutting of the elbow joints.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 6 depicts a methodology of use of the adjustable angle marker system.

Figure 1A:
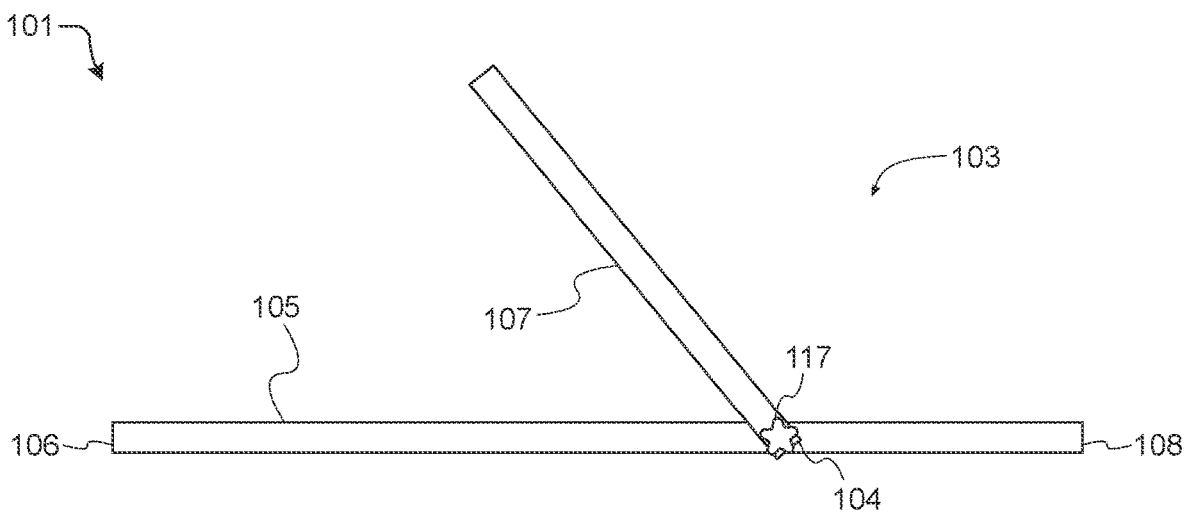
FIGS. 1A-1C show the adjustable angle gauge, marking platform, and pipe marking device according to a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional means of angle marking for cutting pipe elbow joints. Specifically, the system of the present invention provides an adjustable and precise mechanism for marking cutting lines on pipe elbow joints at irregular angles. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 1B:
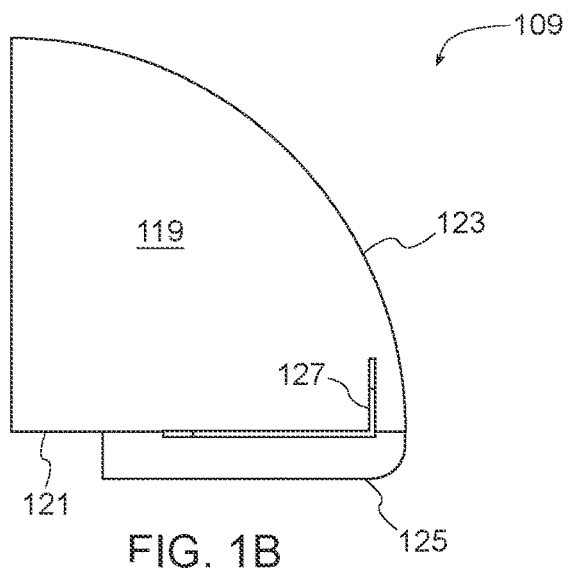
Figure 1C:
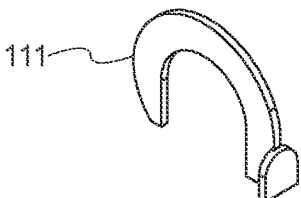
Figure 2:
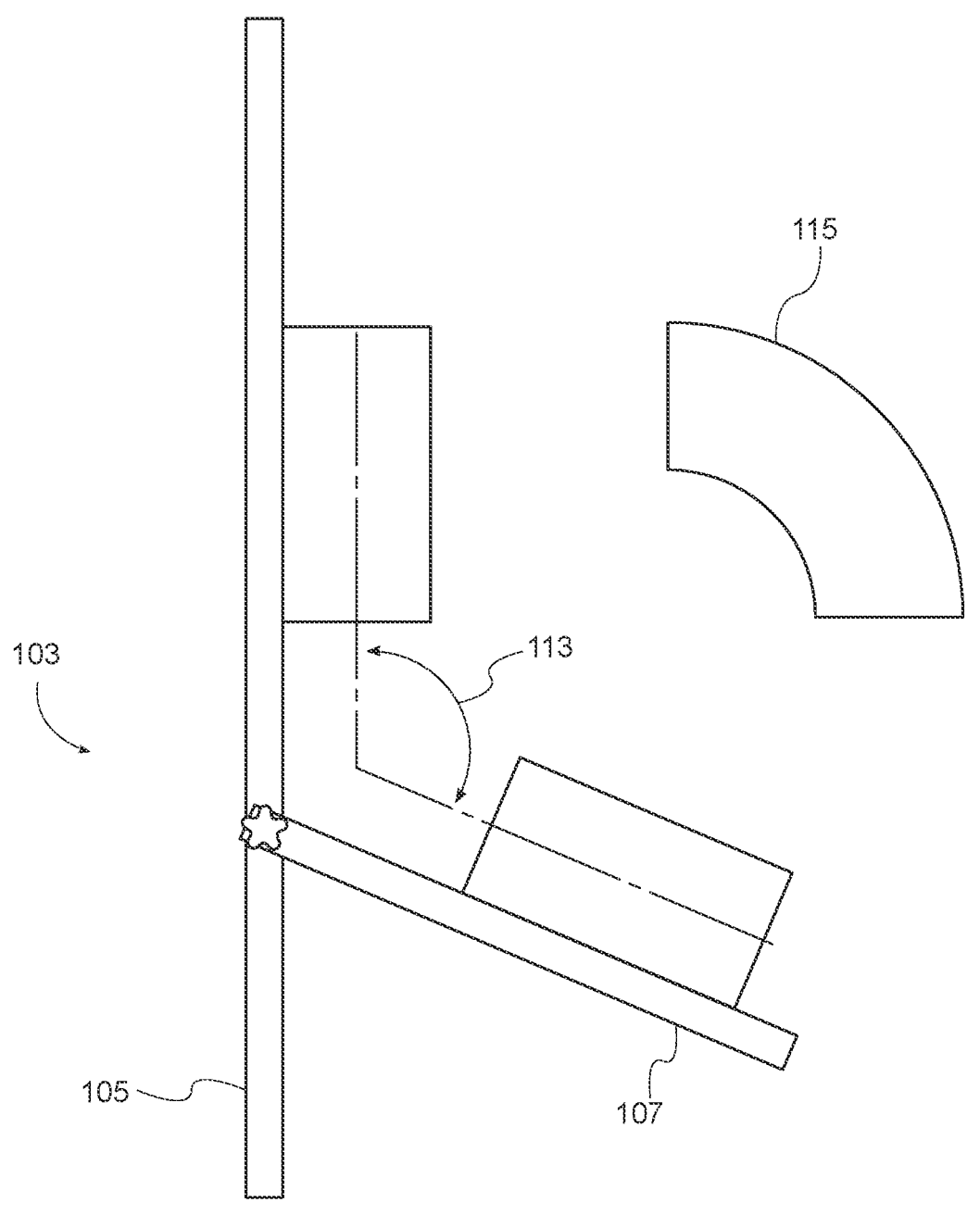
FIG. 2 shows the adjustable angle gauge being used to determine the desired angle.
Figure 3:
FIG. 3 shows the desired angle being transferred to the marking platform as an angle mark.
Figure 3:
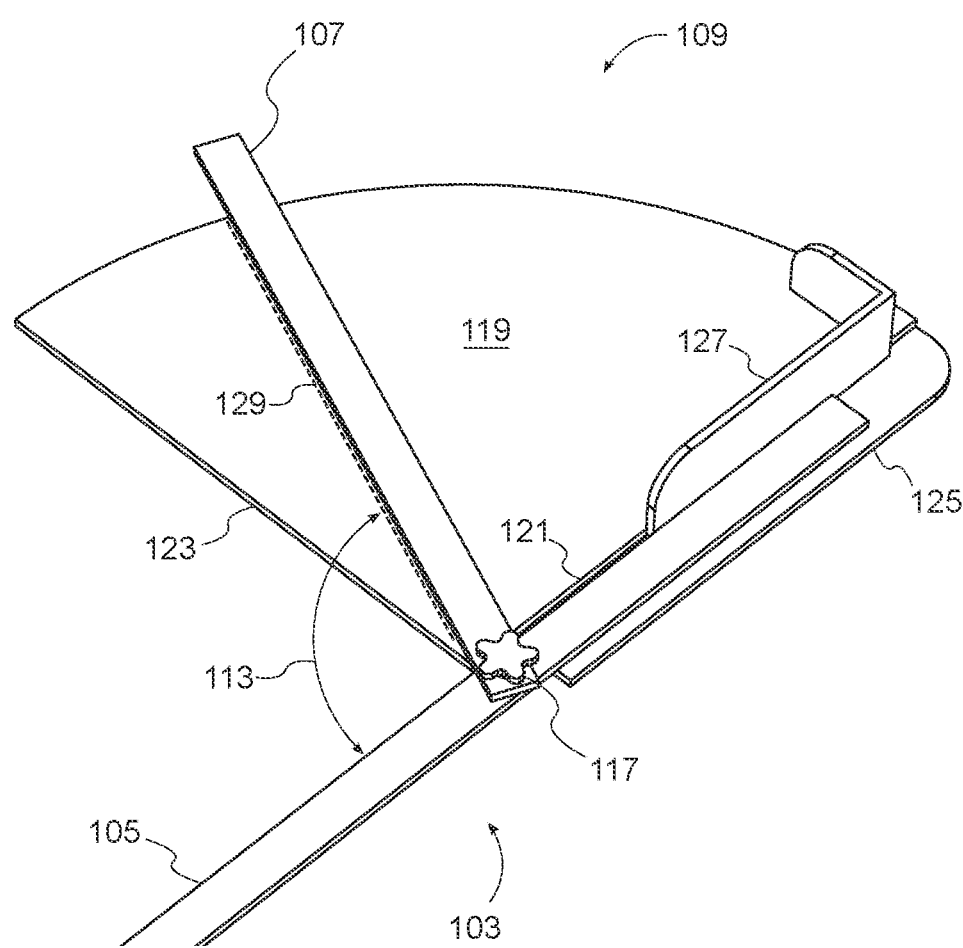

Referring now to the drawings wherein like reference characters identify corresponding or similar elements throughout the several views, FIGS. 1-3 depict several views of an adjustable angle marker system for pipe elbow joints 101 in accordance with a preferred embodiment of the present application. It will be appreciated that system 101 overcomes one or more of the above-listed problems commonly associated with conventional angle marking methods. In addition, it should be appreciated that more or fewer of such components may be included in different embodiments of the system.

In the contemplated embodiment, system 101 includes an adjustable angle gauge 103 with a base arm 105 and an adjustable arm 107 pivotally connected thereto, a marking platform 109, and a pipe marking device 111.

The adjustable arm 107 is configured to be selectably affixed at the desired angle 113 relative to the base arm 105. This is achieved through a fastening mechanism 117, which allows the user to lock the adjustable arm 107 in position once the desired angle has been determined. The adjustable angle gauge 103 enables a user to mark a 90-degree elbow joint 115 at the desired angle 113 for cutting in order to properly join the ends of two pipe sections oriented at the desired angle 113 to each other. More particularly, the adjustable arm 107 is pivotally connected to the base arm 105 at a first end 104 of the adjustable arm 107, between a first end 106 and a second end 108 of the base arm 105. In the contemplated embodiment, the fastening mechanism 117 comprises a screw tightening mechanism, though any suitable fastening means may be utilized in various embodiments.

One of the unique features believed characteristic of the present application is the ability of the adjustable angle marker system 101 to easily and accurately accommodate irregular angles, greatly simplifying the cutting process for angles that do not neatly divide into 180 degrees, such as 67 degrees or 21 degrees. By directly measuring the angle required and using said measurement to cut the elbow joint 115, the need for numerical calculation is eliminated.

The marking platform 109 is used in the present system as a transfer medium, being configured to receive the desired angle 113 from the adjustable angle gauge 103 and correspondingly facilitate transfer of the desired angle 113 to the elbow joint 115.

The marking platform 109, depicted in FIGS. 1B and 3, comprises a quadrant body 123, a base arm shelf 125, and an elbow joint stabilizer 127. The marking platform 109 is configured to receive the adjustable angle gauge 103 abutted thereto and to receive marking corresponding to the desired angle 113 on a marking surface 119. The quadrant body 123 is shaped as a quarter circle and provides a flat surface for marking. The base arm shelf 125 is located adjacent to a bottom edge 121 of the quadrant body 123, serving as a secure resting area for the base arm 105 of the adjustable angle gauge 103. This assists in ensuring that the adjustable angle gauge 103 is properly aligned to the marking platform 109 during the marking process.

As shown in FIG. 3, with the adjustable angle gauge 103 affixed at the desired angle 113, the base arm 105 is placed onto the base arm shelf 125 abutted to the bottom edge 121 of the quadrant body. An angle mark 129 is made by the user on the marking surface 119 along the adjustable arm 107. The angle mark 129 therefore defines the desired angle 113 relative to the bottom edge 121.

The elbow joint stabilizer 127 is connected atop the quadrant body 123, adjacent to the bottom edge 121. It is shaped as an L, with its longer side lying parallel to the bottom edge 121 of the quadrant body 123, and its shorter side extending vertically. This structure creates a joint cradle that securely holds an end of an elbow joint 115 during the marking process, ensuring stability and accuracy.

The pipe marking device 111 is provided in the system 101 of the present invention to facilitate the transfer of the desired angle 113 from the marking platform 109 to the elbow joint 115. The pipe marking device 111 is a bracket with a pipe cradle sized to fit over the elbow joint 115. It should be appreciated that the pipe marking device 113 can be configured to accommodate elbow joints of various diameters.

Figure 4:
FIG. 4 shows the angle mark and the pipe marking device being used to inscribe a cutting mark on an elbow joint.
Figure 4:
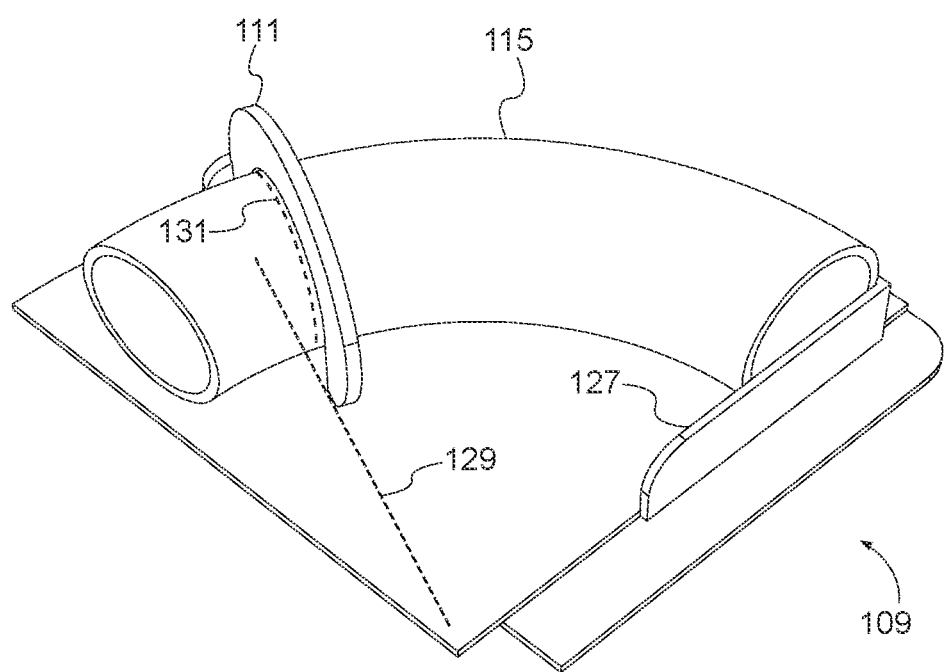

Referring to FIG. 4, to mark a cutting mark 131 on the on the elbow joint 115, with the elbow joint 115 positioned on the elbow joint stabilizer 127 as described above, the pipe marking device 111 is placed over the elbow joint 115 and aligned with the angle mark 129 inscribed on the marking surface 119. The cutting mark 131 is then marked on the elbow joint 115 using the pipe marking device 111 as a guide, wherein the pipe marking device 111 is used to circumferentially delineate the cutting mark 131 around the elbow joint 115 at the desired angle 113. The pipe marking device 111 may further comprise a stabilizing element enabling the marking device to stand upright while positioned over the elbow joint 115 to ensure correct alignment.

In some embodiments, the pipe marking device 111 may comprise an integrated marking implement, such as a pen or a scribe, or an implement receptacle configured to receive and secure the same, which is movably connected along the pipe marking device 111 to easily and accurately make the cutting mark 131 on the elbow joint 115.

Figure 5:
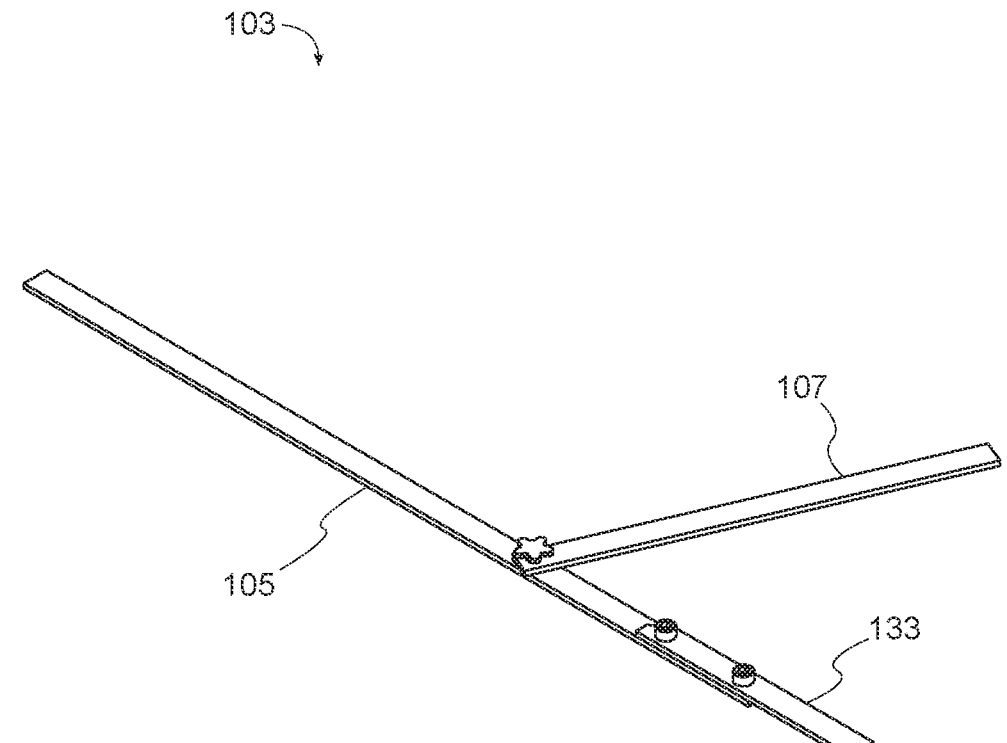
FIG. 5 is a perspective view illustrating an extension arm of the adjustable angle gauge.

It is also contemplated and will be appreciated that system 101 can incorporate a base arm extension 133 that can be removably connected to the base arm 105, as seen in FIG. 5. The base arm extension 111 allows the system 101 to be adaptable to a wide range of pipe elbow joint sizes, including those with oversized radii.

The base arm extension 133 is configured to extend the length of the base arm 105 when needed. It can be constructed from a material similar to that of the base arm 105 and adjustable arm 107, ensuring that it maintains a sturdy and rigid structure during use. One end of the base arm extension 133 includes a connecting feature, such as a set of screw holes or a clip, that aligns with a corresponding feature on the base arm 105. This allows the base arm extension 133 to be quickly and easily attached or detached as needed.

Turning now to FIG. 6, depicted is a method of use 601 for the adjustable angle marker system 101 as shown in FIGS. 1-5, which allows for the accurate determination and marking of a cut angle for pipe elbow joints. The method initiates with step 603 of providing two pipe sections and the adjustable angle marker system 101.

In step 605, the two pipes are positioned at a desired angle relative to each other. The desired angle can be determined based on the particular requirements of the pipe assembly.

In step 607, the base arm 105 of the adjustable angle gauge 103 is aligned with the first pipe. The base arm 105 can be placed along the length of the pipe such that one end of the base arm 105 is in contact with or close proximity to the end of the pipe that is to be joined with the elbow joint.

The method 601 then includes step 609, wherein the adjustable arm 107 of the adjustable angle gauge 103 is aligned with the second pipe. Similar to the base arm 105, the adjustable arm 107 is positioned along the length of the second pipe, with one end of the adjustable arm 107 near the end of the pipe that will be connected to the elbow joint.

Following alignment, in step 611 the fastening mechanism 117 is engaged to secure the base arm 105 and the adjustable arm 107 at the desired angle relative to each other. The engagement of the fastening mechanism 117 ensures that the desired angle 113 is held constant as the adjustable angle gauge 103 is moved to the marking platform 109.

In step 613, the base arm 105 is positioned adjacent to the reference edge on the marking platform 109, which is the aforementioned bottom edge 121. This step aligns the adjustable angle gauge 103 such that the adjustable arm 107 defines an angle on the surface of the marking platform 109, corresponding to the desired angle 113.

Next, in step 615, an angle mark 129 is inscribed on the surface of the marking platform 109 along the adjustable arm 107. This angle mark 129 provides a reference for the subsequent marking on the elbow joint 115.

Step 617 involves positioning the elbow joint 115 within the joint cradle provided on the marking platform 109 with the aforementioned elbow joint stabilizer 127. The elbow joint 115 is placed such that one of its ends rests flush with the elbow joint stabilizer 127, parallel to the bottom edge 121.

In step 619, the pipe marking device 111 is positioned on the elbow joint 115 in alignment with the angle mark 129. The placement recess of the pipe marking device 115 fits snugly over the elbow joint 115, ensuring that the marking device 111 maintains accurate alignment between the angle mark 129 and its proper corresponding location on the elbow joint 115.

Step 621 involves circumferentially inscribing a cutting mark 131 on the elbow joint 115 using the pipe marking device 111. The cutting mark 131 represents the precise location where the elbow joint 115 should be cut to create a joint that will connect the two pipes at the desired angle 113.

The method 601 concludes with step 623, wherein a cut is performed on the elbow joint along the inscribed cutting mark 131. After the cut is made, the newly cut elbow joint can be fitted between the two pipes to create a secure, accurately angled joint.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An adjustable angle marker system for pipe elbow joints comprising:

an adjustable angle gauge with a base arm and an adjustable arm pivotally connected thereto, the adjustable arm being configured to be selectably affixed at a desired angle relative to the base arm, wherein a 90 degree elbow joint is to be cut at the desired angle in order to properly join the ends of two pipes oriented at the desired angle to each other;

a marking platform, configured to receive the adjustable angle gauge abutted thereto and configured to receive marking corresponding to the adjustable blade angle on a marking surface;

a pipe marking device configured to circumferentially delineate a cutting mark around the 90 degree elbow joint at the desired angle; and a base arm extension removably connected to the base arm, wherein the base arm extension is configured to extend the base arm in order to measure an oversized radius of the elbow joint.

2. The adjustable angle marker system for pipe elbow joints of claim 1, wherein the adjustable arm is pivotally connected to the base arm at a first end of the adjustable arm, between a first end and a second end of the base arm.

3. The adjustable angle marker system for pipe elbow joints of claim 1, wherein the adjustable arm is selectably affixed in the desired angle through a fastening mechanism.

4. The adjustable angle marker system for pipe elbow joints of claim 1, wherein the marking platform comprises a marking surface, a base arm shelf, and an elbow joint stabilizer, wherein the base arm shelf is connected along a bottom edge of the marking surface and configured to receive and align the base arm thereto, and wherein the elbow joint stabilizer is connected atop the marking surface adjacent to the bottom edge 121 and configured to securely hold an end of an elbow joint thereto during marking of the elbow joint with the desired angle.

5. A method of determining and marking a cut angle for pipe elbow joints, the method comprising the steps of:

providing two pipe sections to be connected by an elbow joint;

providing an adjustable angle marker system for pipe elbow joints as claimed in claim 1;

positioning the two pipes at a desired angle relative to each other;

aligning the base arm of the adjustable angle gauge with the first pipe;

aligning the adjustable arm of the adjustable angle gauge with the second pipe;

engaging a fastening mechanism to secure the base arm and the adjustable arm at the desired angle relative to each other;

positioning the base arm adjacent to a reference edge on the marking platform, such that the adjustable arm defines an angle on the surface of the marking platform;

inscribing an angle mark on the surface of the marking platform along the adjustable arm;

positioning an elbow joint to be cut within a joint cradle provided on the marking platform;

positioning a pipe marking device on the elbow joint in alignment with the angle mark;

circumferentially inscribing a cutting mark on the elbow joint using the pipe marking device; and performing a cut on the elbow joint along the inscribed cutting mark.

\* \* \* \* \*